US007261021B1

(12) United States Patent
Carnesi

(10) Patent No.: US 7,261,021 B1
(45) Date of Patent: Aug. 28, 2007

(54) ADJUSTABLE SOCKET

(76) Inventor: Thomas Carnesi, 1309 Manuel Ave., Torrance, CA (US) 90501

( * ) Notice: Subject to any disclaimer, the term of this patent is extended or adjusted under 35 U.S.C. 154(b) by 0 days.

(21) Appl. No.: 11/715,123

(22) Filed: Mar. 8, 2007

Related U.S. Application Data

(63) Continuation-in-part of application No. 11/356,754, filed on Feb. 18, 2006, now abandoned.

(51) Int. Cl.
*B25B 13/18* (2006.01)
*B25B 13/12* (2006.01)
*B23B 31/16* (2006.01)

(52) U.S. Cl. .............................. 81/128; 81/129; 279/71

(58) Field of Classification Search .................. 81/128, 81/129; 279/51, 58, 71, 122
See application file for complete search history.

(56) References Cited

U.S. PATENT DOCUMENTS 3,724,299 A * 4/1973 Nelson ........................ 81/128
4,213,355 A * 7/1980 Colvin ........................ 81/128
4,378,714 A * 4/1983 Colvin ........................ 81/128
4,663,999 A * 5/1987 Colvin ........................ 81/128
5,207,129 A * 5/1993 Fossella ...................... 81/63.2
5,305,670 A * 4/1994 Fossella et al. .............. 81/63.2
5,448,931 A * 9/1995 Fossella et al. .............. 81/63.2
5,819,607 A * 10/1998 Carnesi ....................... 81/128
5,996,446 A * 12/1999 Lee ............................ 81/128
6,073,522 A * 6/2000 Carnesi ....................... 81/128
7,062,996 B2 * 6/2006 Johnson ....................... 81/128
2006/0086211 A1 * 4/2006 Johnson ....................... 81/128

* cited by examiner

*Primary Examiner*—David B Thomas
(74) *Attorney, Agent, or Firm*—Irving Keschner

(57) ABSTRACT

An adjustable socket having first and second jaw members having manually selectable sizes. An exterior drive unit and a moveable inner driver unit each having serrated interlocking teeth are positioned to either engage during wrenching, or to be disengaged for socket size manual adjustments. The opposing first and second jaw members are forced by axial rotation of a spiral cam element located on the open top end of the outer drive unit to move laterally, inward or outward, when a user pulls the inner driver unit in a first direction and rotates the inner drive unit such that the first and second jaw members are positioned to engage a selected fastener head.

8 Claims, 7 Drawing Sheets

DISENGAGED
11/16 INCH JAW OPENING

ENGAGED
3/8 INCH JAW OPENING

ADJUSTABLE SOCKET

CROSS-REFERENCE TO RELATED APPLICATIONS

This application is a continuation-in-part of Ser. No. 11/356,754, filed Feb. 18, 2006 now abandoned by the inventor of the instant application.

BACKGROUND OF THE INVENTION

1. Field of the Invention

The present invention provides a socket having first and second jaw members that enables a user to quickly adjust both metric and inch hex head fasteners of various sizes by rotating a portion of the socket.

2. Description of the Prior Art

In U.S. Pat. Nos. 5,819,607 and 6,073,522, there is disclosed a socket which is manually adjustable to enable the socket to grip nuts or bolts with hexagonal heads of different sizes. Two opposing jaw members are provided which are adjustably spaced apart to grip a hexagonal bolt head of a selected size. Although the socket allows a user to make the necessary adjustments, it includes numerous components that add to the cost of manufacturing the socket.

SUMMARY OF THE INVENTION

The present invention provides a socket which is convenient to use, has a minimum number of parts, is compact enabling it to be used in limited working spaces and to be easily stored, especially for the handyman or sports enthusiasts who may not wish to carry an entire set of individual sockets around. The socket of the present invention also provides improved torque strength, and a visual selector for selecting one of several available size adjustments and providing a numeric indication of size to the user, the overall length of the socket remaining constant when the socket is adjusted to a selected hexagonal fastener size.

Specifically, the adjustable socket of the present invention comprises an external driver having a longitudinal axis that provides permanent indicia in both metric and inch that are radially located on the external drive surface to indicate a selected size associated with each jaw opening and an inner drive member having serrated teeth in its lower area and a diametrically located groove at its extreme lower end adjacent to the open bottom end to retain a snap-ring to contain the interior components of the socket.

The axially moveable inner drive member is positioned within the exterior drive member and is manually rotatable to different radial positions corresponding to the selected socket size openings. The inner drive member has serrated exterior teeth that coacts with interior serrated teeth formed on the interior surface of the external driver. The inner driver member has a central square opening, typically ⅜ inches, centrally located at the axis to accept a corresponding universal male driver for wrenching. The inner drive member has a t-slot to accept jaw members that are positioned to move laterally. The lower portion of the inner drive member extends downward beyond the external driver and includes a knurled diameter member to enable a user to grip the socket when the user needs to make adjustments for various fastener sizes.

A plurality of jaw members are laterally mounted to the top end of the inner drive member to move laterally, within a t-slot, between fixed lateral positions upon rotation of the inner drive member. Each fixed lateral position corresponds to a selected socket size opening, each jaw member having an external radius that is in constant contact with that of the radial cam surface formed on the interior of the external driver, the jaw members being laterally positioned as the inner driver is axially rotated. Each jaw member has a 120 degrees v-notch to accept hexagonal configured fasteners. With the inner drive member in a first axial position and capable of being rotated, the inner drive unit is simultaneously pulled downward by the user, disengaging the serrated teeth formed thereon from the serrated teeth formed on the interior surface of the external driver, thereby causing the jaw members to move laterally to a selected socket size. In a second axial position, the exterior serrated teeth of the inner drive unit is released, via a spring bias, and interlocked with the interior serrated teeth within the exterior driver to maintain the selected socket size.

A deflection spring member is located between the bottom portion of the inner drive unit below the exterior serrated teeth, and the top for the snap/retainer ring, the spring normally forcing the inner drive unit upward to maintain constant engagement of its outer serrated teeth and the inner serrated teeth of the exterior driver member into a position where the teeth of the inner drive unit and the teeth of the indexing collar engage.

The exterior circumference of the exterior drive member has visible indicia associated with each selectable position to indicate the selected socket size openings.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 3:
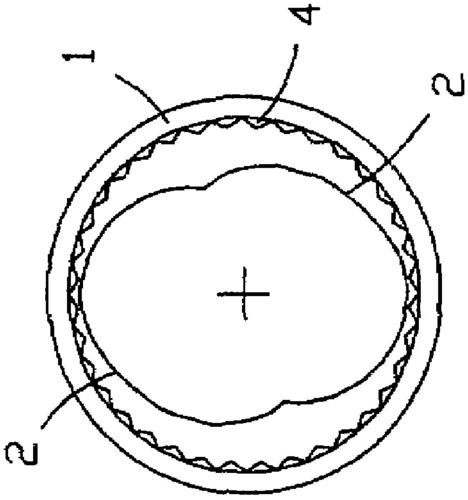
FIG. 3 is the bottom view of the of the first embodiment of the present invention showing its interior.
Figure 4:
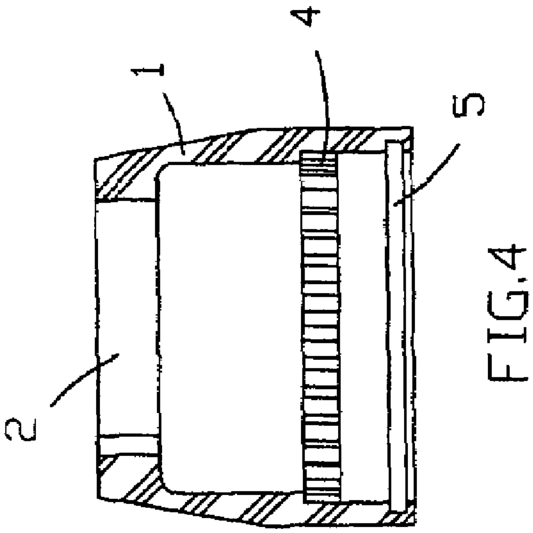
FIG. 4 is a cross sectional view of the first embodiment taken along FIG. 4-FIG. 4 of FIG. 2 showing one side of the upper spiral cam, serrated teeth and radial groove to house the retaining ring.
Figure 1:
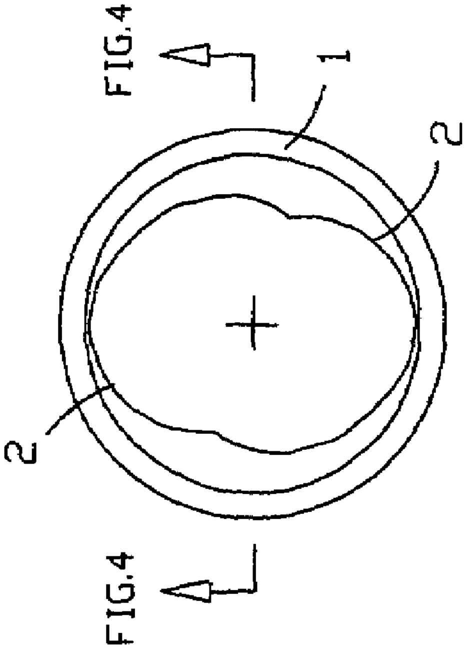
FIG. 1 is the top plan view of the first embodiment of the adjustable socket of the present invention.
Figure 2:
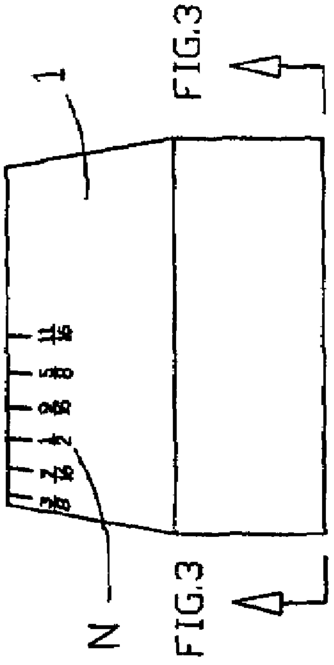
FIG. 2 is a side view of the of the first embodiment of the adjustable socket of the present invention.
Figure 7:
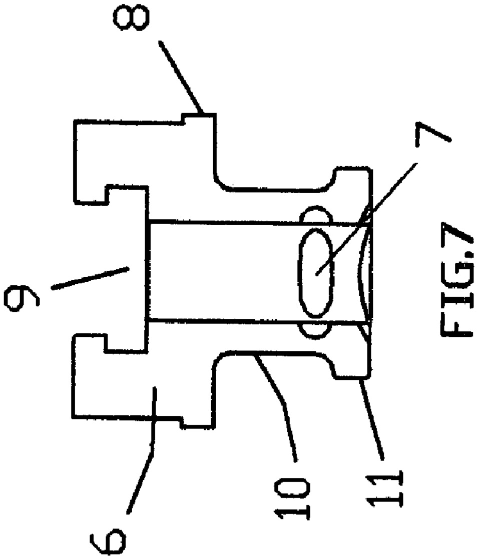
FIG. 7 is a cross sectional view of the second embodiment taken along FIG. 7-FIG. 7 of FIG. 5 for the present invention.
Figure 8:
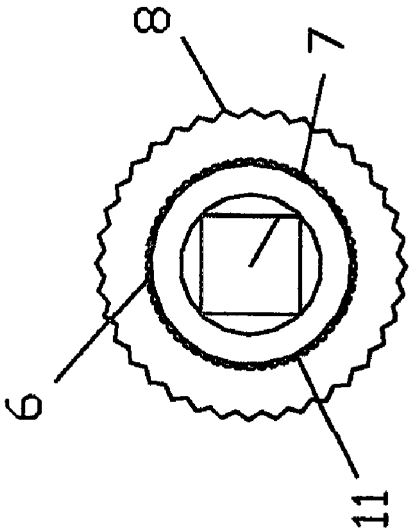
FIG. 8 is the bottom view of the second embodiment of present invention showing the ⅜ inch square driver cavity and the serrated exterior teeth.
Figure 5:
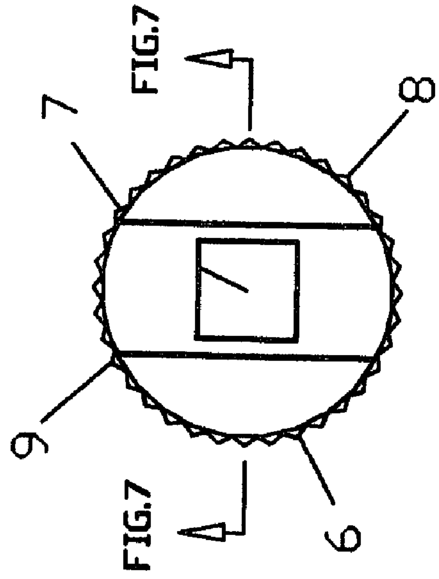
FIG. 5 is a top view of a second embodiment of the adjustable socket of the present invention.
Figure 6:
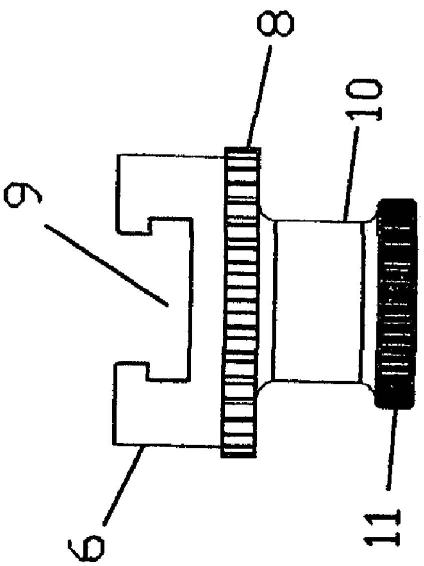
FIG. 6 is the side plan view of the second embodiment of the adjustable socket showing the lateral slot for the jaw installation on the present invention.
Figure 9:
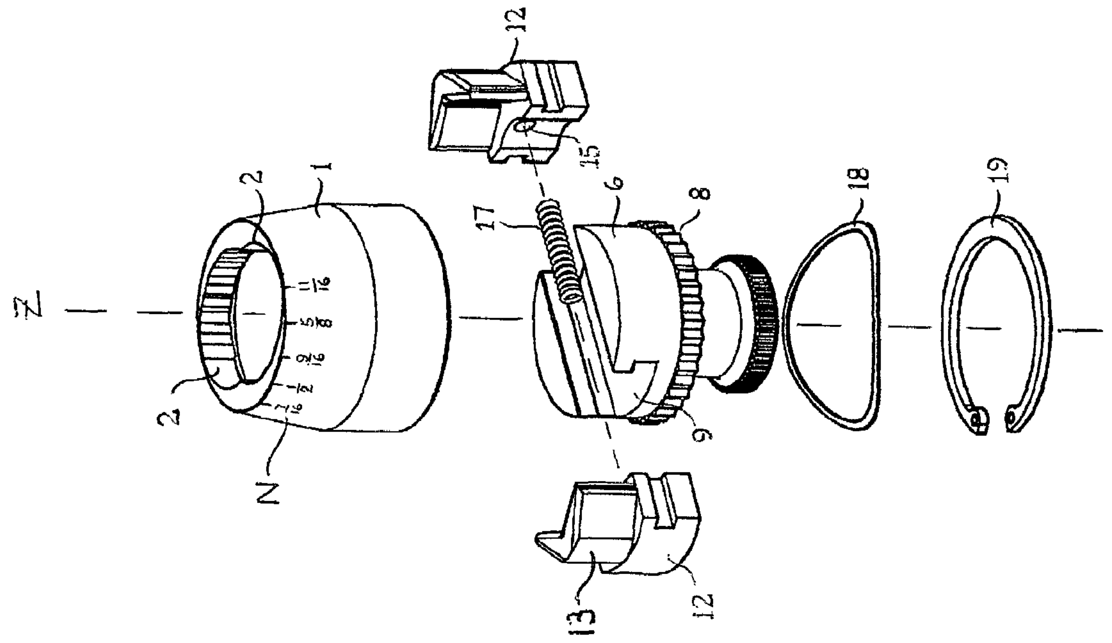
FIG. 9 is an exploded isometric view looking approximately 30 degrees downwards at the components of adjustable socket embodiment.
Figure 10:
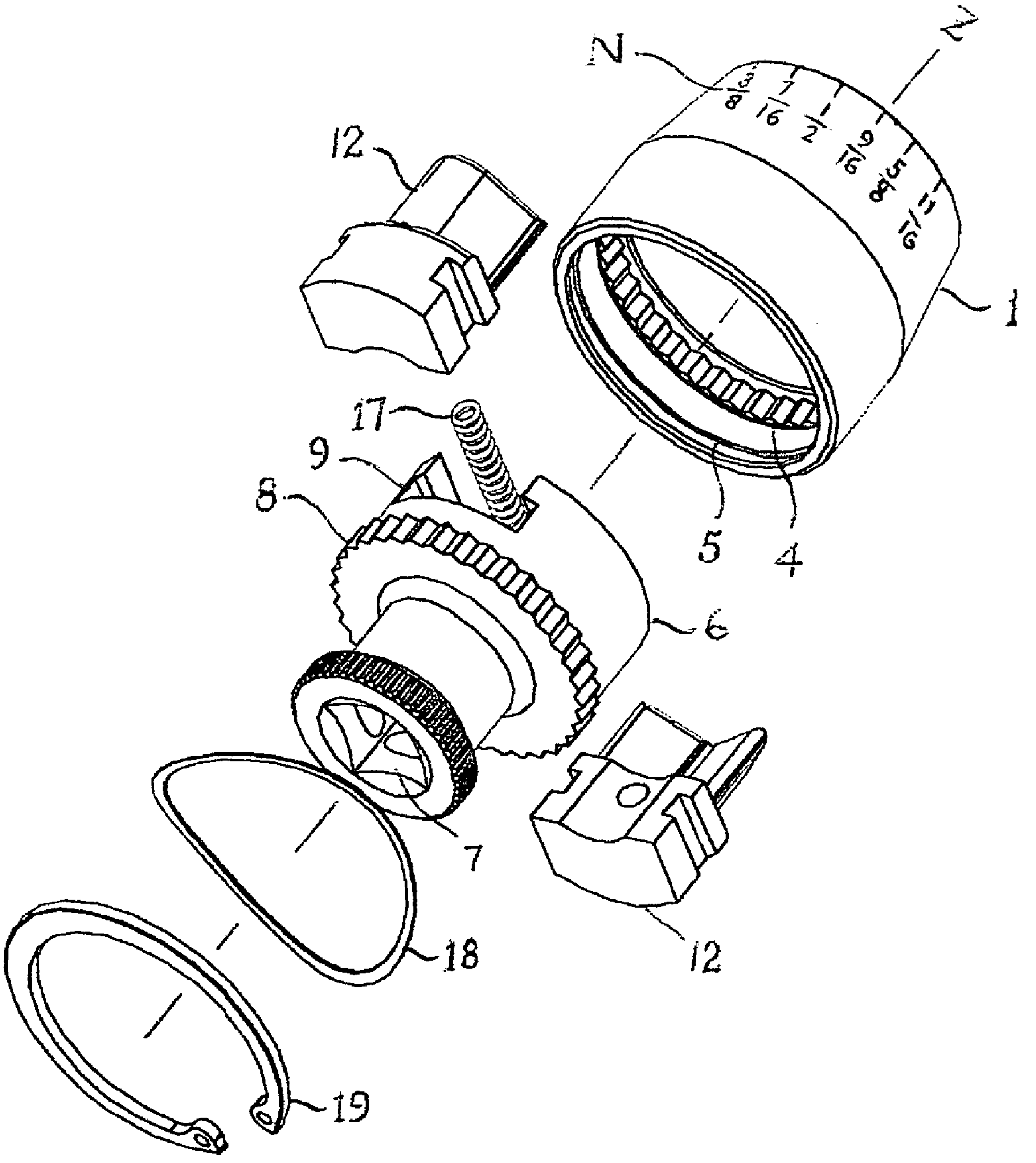
FIG. 10 is an exploded isometric view, looking approximately 30 degrees upwards, showing all the components, including the ⅜ inch square drive cavity, of the adjustable socket of the present invention.
Figure 13:
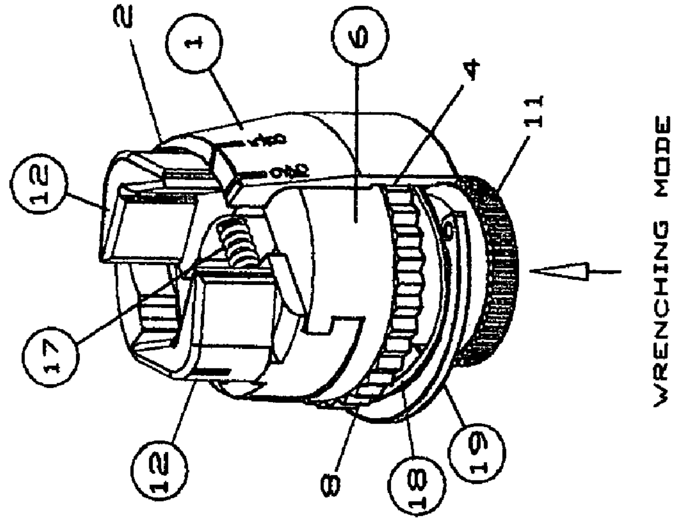
FIG. 13 is a view of the adjustable socket fully assembled except with a cut-away showing the serrated teeth engaged.
Figure 12:
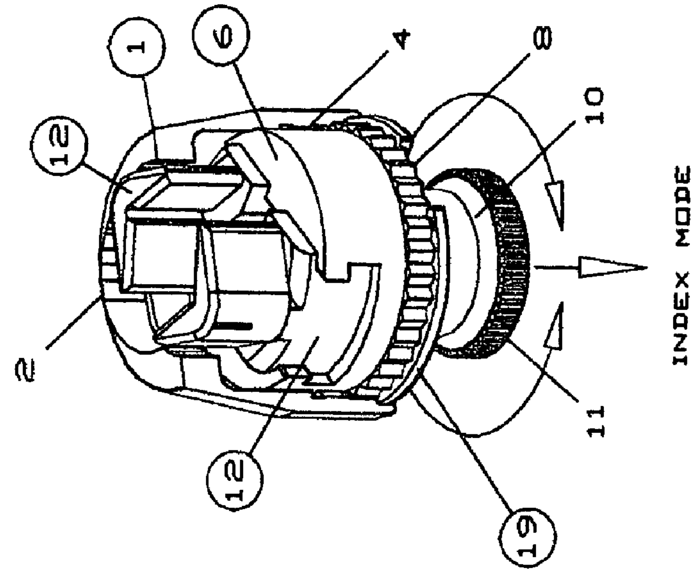
FIG. 12 is a view of the adjustable socket fully assembled with a cutaway to show the serrated teeth disengaged.
Figure 11:
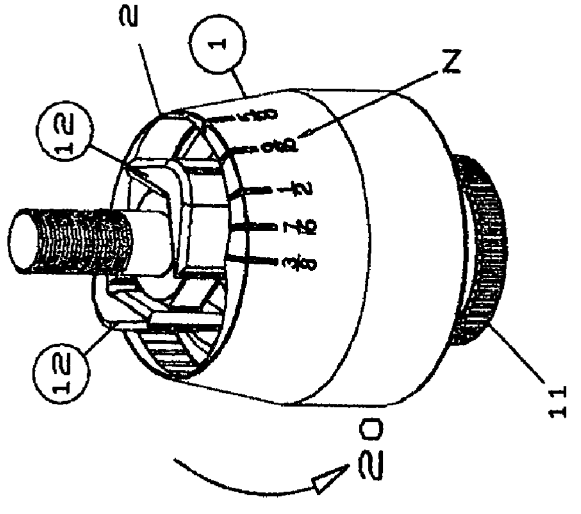
FIG. 11 is an isometric view of the adjustable socket embodiment fully assembled with the jaw members gripping a standard hexagonal fastener.
Figure 15:
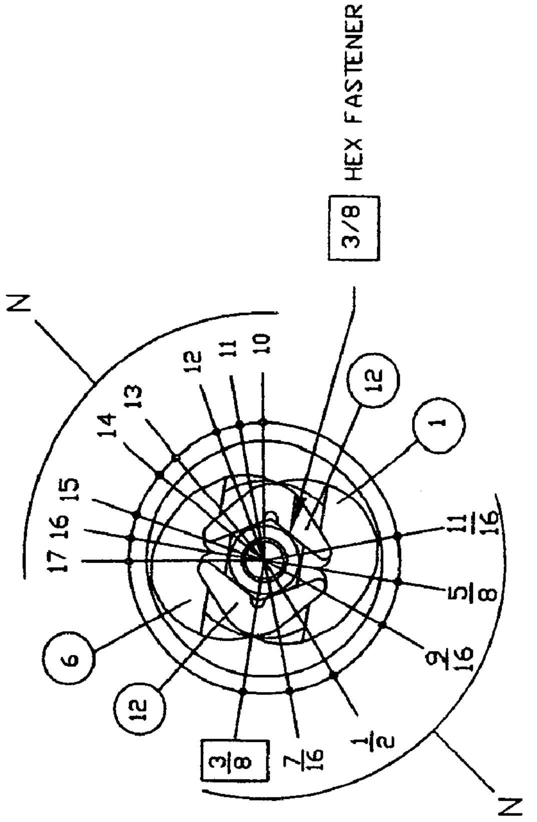
FIG. 15 is a top view of the socket with jaws set to 3⁄8 inch opening.
Figure 14:
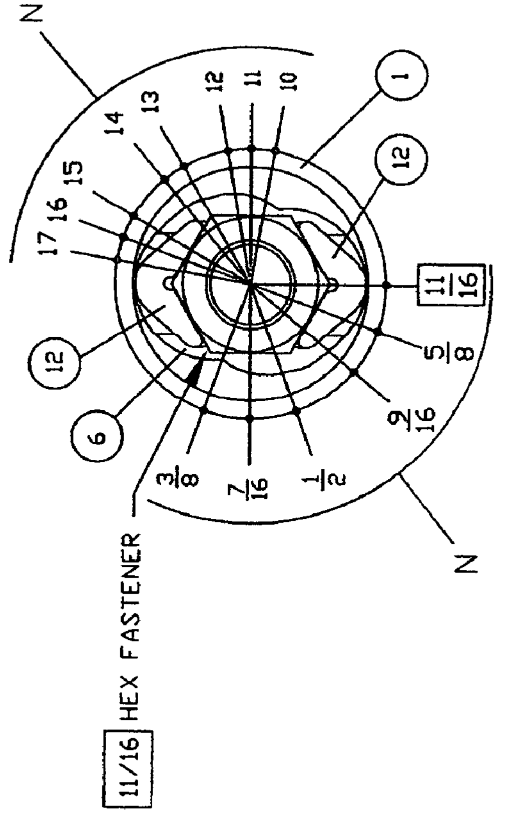
FIG. 14 is a top view of the socket with jaws set to 11⁄16 inch opening.
Figure 20:
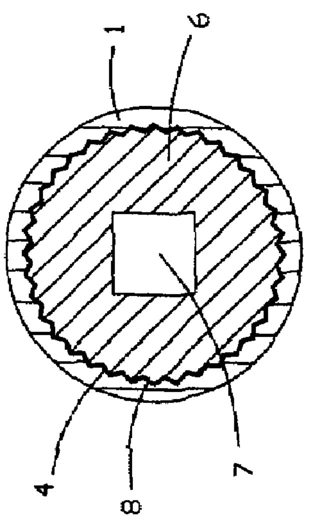
FIG. 20 is a sectional view along line 20-20 of FIG. 16 showing the teeth of the exterior driver engaging the teeth of the inner drive unit and the square (wrench) driver cavity.
Figure 19:
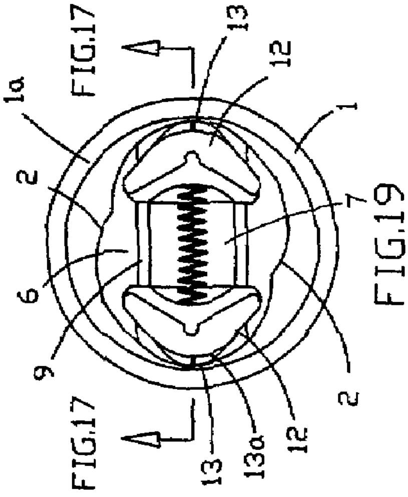
FIG. 19 is a top view of the adjustable socket with the jaw members to a 11⁄16 inch opening.
Figure 17:
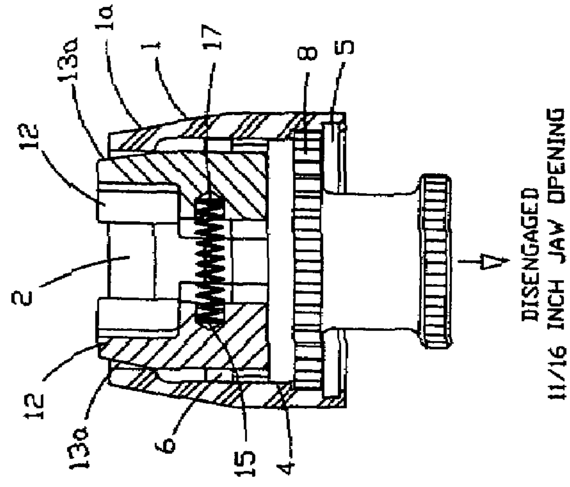
FIG. 17 is a cross-sectional view along line 17-17 of FIG. 19 illustrating the jaws set to accept a 11⁄16 inch hex head fastener.
Figure 18:
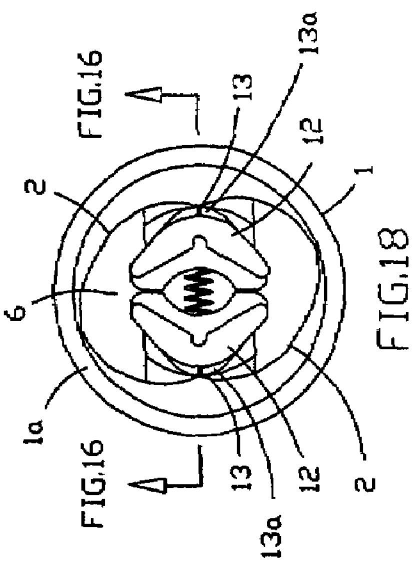
FIG. 18 is a top view of the adjustable socket with the jaws set to a 3⁄8 inch hex head fastener.
Figure 16:
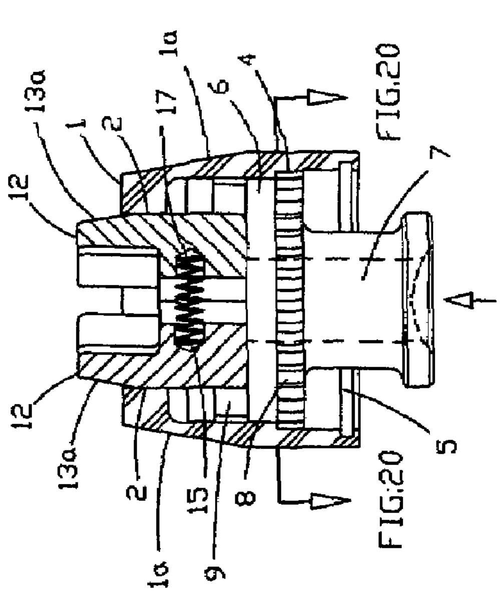
FIG. 16 is a cross-sectional view along line 16-16 of FIG. 18 illustrating the jaws gripping a 3⁄8 inch hex fastener.

Referring to the Figures, the adjustable socket 20 of the present invention comprises an external cylindrical driver/housing 1 that has an upper spiral cam plane 2 centered from longitudinal Z axis, permanently marked sizes in both metric and inch located radially on the circumference of exterior driver 1 associated with each adjusted size N. Preferably, the exterior driver 1 includes serrated teeth 4 in its lower area, and a diametrically located radial cam surface, or groove, 5 at its extreme lower end adjacent to the open bottom end to retain a snap-ring 19 to contain the interior components therein.

An axially moveable inner drive member 6 is positioned within the exterior driver 1 and is manually rotatable to different radial positions corresponding to the selected socket size openings, designated N. The serrated exterior teeth 8 at a lower area corresponds with the interior serrated teeth 4 of exterior driver 1. The inner drive member 6 has a central 3⁄8 opening 7 and centrally located at the Z axis to accept a universal 3⁄8 inch male driver for wrenching. The inner drive member 6 has a t-slot feature 9 at its top area at right angle to axis Z to accept jaw members 12 that are located adjacent thereto and are adapted to move laterally. The extreme lower portion 10 of inner drive member 6 sufficiently extends downward, and beyond the driver 1 which has a knurled diameter member 11 for gripping purposes, when a user needs to make an adjustment for various fastener sizes.

Opposing jaw members 12 are laterally mounted and positioned at the top end of the inner drive member 6 and adapted to move laterally, within t-slot feature 9, between fixed lateral positions upon rotation of the inner drive member 6. Each fixed lateral position corresponds to a selected socket size jaw opening. Each of the jaw members 12 have an external radius 13 that is in constant contact with the radial cam surface 5 of the external driver 1, the jaw members 12 being laterally movable by the inner drive member 6 during axial rotation thereof. The jaw members 12 each have a 120 degrees v-notch 14 to accept hexagonal configured fasteners and each have a horizontal hole 15 and 16 to house a bias spring 17 to separate the jaw members 12, thus maintaining the constant tension at their exterior radius, or surface, 13 against the spiral cam plane, or surface, 2. With the inner drive member 6 in the first axial position, it is rotatable by the extreme lower knurled member 11 of the inner drive member 6 when simultaneously pulled downward by a user, thereby disengaging (disengagement mode) the serrated exterior teeth 8 from the serrated teeth 4 of the exterior drive 1 and causing the jaw members 12 to move laterally to a selected socket size N. In the second axial position, the knurled member 11 is rotated such that the jaw members 12 are positioned to the selected socket size N and then released such that inner drive member 6 moves upwards whereby the exterior serrated teeth 8 of the inner drive member 6 and the interior serrated teeth 4 of the exterior drive 1 are interlocked therewith to maintain the selected socket size N (engaged mode).

A wavy type, deflection spring member 18 nests horizontally between the bottom portion of the inner drive member 6, and just below its exterior serrated teeth 8, and the top of the snap/retainer ring 19. The deflection of spring member 18 normally forces the inner drive member 6 upwards to maintain constant engagement of its outer serrated teeth 8 and the inner serrated teeth 4 of the exterior drive 1 in the engaged mode.

The visible indicia associated with each selectable position provides an indication of a selected socket size N opening of the jaw members 12.

The adjustable socket of the present invention has a continuous adjustment such that when a user makes a counterclockwise radial adjustment from the largest size to the smallest size (3⁄8 inch hex head fastener), the cam configuration causes the jaw members to continue to cycle (adjust) onto the largest size (11⁄16 inch hex head fastener) and the smaller sizes thereafter. The user thus does not have to reverse adjust (clockwise) the direction of the socket to larger sizes. This feature reduces the time needed for size adjustments by the user.

The jaw members have an approximately 10 degrees radius relief 13*a* at their outer top surface to allow the two opposing jaws to widen their distal adjustment during disengagement and radial adjustment. This enables the jaws 12 to grip a hex head fastener that maybe oversize or corroded when encountered and is accomplished when the inner drive member 6 is disengaged (downward) from the exterior driver 1 during the adjustment mode thus widening the jaw members 12 to an additional distal lateral distance. The angular relief (10 degrees) on the upper surface of jaw members 12 matches the 10 degrees 1*a* on the upper surface of the exterior drive 1. This relief (10 degrees) on jaw members 12 allows ease of access to fasteners that may be confined in a counter bored surface.

Each jaw member 12 has a notched vertical indicator line to align with that of the visible indicia is located on the upper exterior driver housing 1 and designated N.

The cam geometry on the upper opening of exterior drive 1 is configured in such a manner that when torque is applied to a hex head fastener during tightening or loosening, the jaw members 12 are influenced and supported by the cam walls at the plane of the fastener level, preventing outward drifting of the opposing jaws that otherwise results in rounding/stripping the corners of hex head fasteners and nuts either during the tightening or loosening sequence.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. An adjustable socket with a number of selectable socket size openings available to accommodate different size fasteners, an exterior drive member having a longitudinal axis, an end of said exterior drive member having a cam surface, a series of serrated teeth and a grooved diameter positioned at said end, an axially moveable inner drive unit positioned within said exterior drive member, said inner drive unit being manually rotatable to different positions corresponding to a selected socket size opening, first and second jaw members movably secured to said interior drive unit whereby said first and second jaw members are movable to fixed lateral jaw positions, each fixed lateral jaw position corresponding to that of a selected socket size during axial rotation of said inner drive unit; a series of serrated teeth positioned at the lower end of said interior driver unit which engage the serrated teeth formed within said exterior driver member said inner drive member being rotatable in a first second mode when simultaneously pulled in a first direction along said longitudinal axis to disengage the serrated teeth of said exterior driver member and said internal drive unit, thereby enabling a user to adjust said first and second jaw members laterally to a selected socket size, said teeth of said interior drive unit and the teeth of the exterior driver member being interlocked to secure the selected socket size during a second mode of operation, said first and second jaw members each having an angled radius relief on its surface which corresponds to an angled surface formed on said exterior driver member allowing for additional lateral expansion of said first and second jaw members as said inner drive member is pulled in said first direction.

2. An adjustable socket with a number of selectable socket size openings available to accommodate different size fasteners, an exterior drive member having a longitudinal axis, an end of said exterior drive member having a cam surface, a series of serrated teeth and a grooved diameter positioned at said end, an axially moveable inner drive unit positioned within said exterior drive member, said inner drive unit being manually rotatable to different positions corresponding to a selected socket size opening, first and second jaw members movably secured to said interior drive unit whereby said first and second jaw members are movable to fixed lateral jaw positions, each fixed lateral jaw position corresponding to that of a selected socket size during axial rotation of said inner drive unit, a series of serrated teeth positioned at the lower end of said interior driver unit which engage the serrated teeth formed within said exterior driver member said inner drive member being rotatable in a first mode when simultaneously pulled by a user in a first direction along said longitudinal axis to disengage the serrated teeth of said exterior driver member and said internal drive unit, thereby enabling a user to adjust said first and second jaw members laterally to a selected socket size, said teeth of said interior drive unit and the teeth of the exterior driver member being interlocked to secure the selected socket size during a second mode of operation, a spring bias in the second mode of operation forcing the inner drive unit and the exterior drive member into a position wherein the teeth of the inner drive unit and the teeth of said exterior driver are engaged.

3. The adjustable socket of claim 2 where there is visible indicia associated on the exterior surface of said exterior drive member with each selectable position to indicate a numeric size that corresponds to the opening provided by said first and second jaw members.

4. The adjustable socket of claim 3 wherein a corresponding mark is formed on said first jaw member, said corresponding mark aligning with the position of the opening of said first and second jaw members.

5. The adjustable socket of claim 2 wherein the user continually adjusts said interior drive unit in a first direction until a desired socket size is selected.

6. The adjustable socket of claim 2 wherein said inner drive member is released by the user prior to the initiation of said second mode of operation.

7. An adjustable socket with a number of selectable socket size openings available to accommodate different size fasteners, an exterior drive member having a longitudinal axis, an end of said exterior drive member having a cam surface, a series of serrated teeth and a grooved diameter positioned at said end, an axially moveable inner drive unit positioned within said exterior drive member, said inner drive unit being manually rotatable to different positions corresponding to a selected socket size opening, first and second jaw members movably secured to said interior drive unit whereby said first and second jaw members are movable to fixed lateral jaw positions, each fixed lateral jaw position corresponding to that of a selected socket size during axial rotation of said inner drive unit, a series of serrated teeth positioned at the lower end of said interior driver unit which engage the serrated teeth formed within said exterior driver member, said inner drive member being rotatable in a first second mode when simultaneously pulled by a user in a first direction along said longitudinal axis to disengage the serrated teeth of said exterior driver member and said internal drive unit, thereby enabling a user to adjust said first and second jaw members laterally to a selected socket size, said teeth of said interior drive unit and the teeth of the exterior driver member being interlocked to secure the selected socket size during a second mode of operation and a spring bias positioned adjacent the bottom surface of said inner drive unit and, said spring bias forcing the inner drive unit upward along the longitudinal axis in a second direction thereby engaging the serrated indexing teeth on the interior drive unit into a position where the teeth of the outer drive member and the teeth of the interior drive unit are interlocked.

8. The adjustable socket of claim 7 wherein said inner drive member is released by the user prior to the initiation of said second mode of operation.

* * * * *